W. H. McKNIGHT.
POWDER DUSTER.
APPLICATION FILED APR. 25, 1910.

990,762.

Patented Apr. 25, 1911.

WITNESSES
L. E. Noack.
W. E. Andrew.

INVENTOR
W. H. McKnight.
BY
Schley Davis
ATTORNEY

UNITED STATES PATENT OFFICE.

WALTER H. McKNIGHT, OF FLUVANNA, TEXAS.

POWDER-DUSTER.

990,762.

Specification of Letters Patent. Patented Apr. 25, 1911.

Application filed April 25, 1910. Serial No. 557,569.

*To all whom it may concern:*

Be it known that I, WALTER H. MC-KNIGHT, citizen of the United States, residing at Fluvanna, in the county of Scurry and State of Texas, have invented certain new and useful Improvements in Powder-Dusters, of which the following is a specification.

This invention has particular relation to powder dusters.

The object of the invention is to provide a machine for spraying or ejecting a powder onto plants to destroy insects, like boll weevils and comprising a receptacle containing the powder, means for agitating the powder and an ejecting means.

A further object resides in a portable frame on which a fan box and a powder receptacle tied together, are adjustably mounted.

Finally the object of the invention is to provide means of the character described that will be strong, durable, efficient, and easy of operation, simple and comparatively inexpensive to construct, and also in which the several parts will not be likely to get out of working order.

Figure 1:
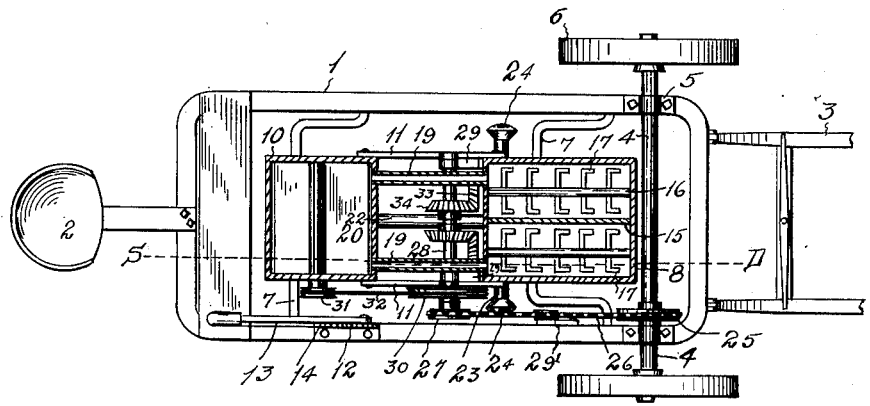
Figure 2:
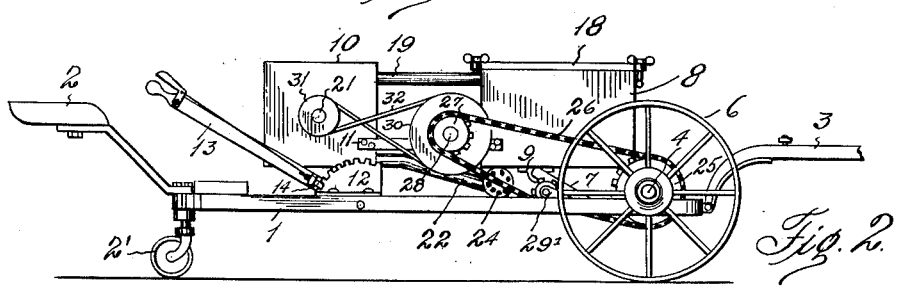
Figure 3:
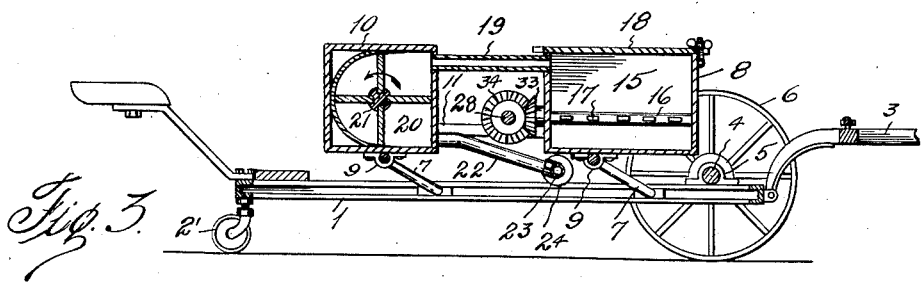
Figure 4:
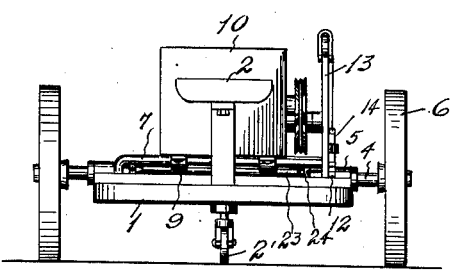

With the above and other objects in view, the invention has relation to certain novel features of construction and operation, an example of which is described in this specification and illustrated in the accompanying drawings, wherein:

Figure 1. is a plan view of the machine, Fig. 2. is a side elevation, Fig. 3. is a longitudinal sectional view on the line S—D of Fig. 1, and Fig. 4. is a rear elevation.

In the drawings, the numeral 1, designates an open frame having a general rectangular shape and with a seat 2 at its rear end and shafts 3 at its forward end. A follower wheel $2^1$ is mounted at the center of the rear of frame. Near its forward end the frame is hung from an axle 4 by bearings 5. The axle projects on each side of the frame and is fixed in ground wheels 6 whereby the axle is revolved.

Crank rods 7 have their lower ends journaled in the sides of the frame and are normally disposed at an angle rearward. Two of the rods are employed, one near the forward end of the frame and the other near the rear end. On the forward crank rod a powder receptacle 8 is mounted and held in place by straps 9; while like straps 9 hold a fan box 10 on the rear crank rod. The receptacle and box are separated some distance, but tied together by side bars 11. On one side of the frame over the bearing point of the rear crank rod, a segment 12 is secured. A hand lever 13 fixed on the lower end of the crank rod extends upward adjacent the segment and carries a plunger 14 engaging the segment. It is obvious that by swinging the hand lever the fan box and powder receptacle are bodily raised and lowered or adjusted in height.

The powder box is divided into compartments by a vertical longitudinal partition 15 and in each compartment a longitudinal beater shaft 16 is journaled. These shafts carry transversely projecting angular beaters 17. By revolving the shafts and beaters, suitable powder placed in the compartments is agitated and constantly stirred up during the operation of the machine. A cover 18 is removably fastened on the receptacle and is removed when it is desired to refill the compartments with powder.

From the upper portion of each compartment, a suction pipe 19 extends to the upper portion of the fan box 10. In the fan box, a suction fan 20 is mounted on a shaft 21 extending transversely through the center of the box. From the lower forward end of the box, a discharge pipe 22 curves downward and forward and supports at its lower end, transverse branch pipes 23 extending at each side over the frame. These branch pipes, each carrying a spray nozzle 24 on its end through which the powder is sprayed onto the plants. It is apparent that by adjusting the receptacle and fan box the spray pipes are raised and lowered. The beaters and fan being revolved by means hereinafter described, the powder is agitated in the compartments and drawn through the pipes 19 into the fan box from which it is ejected into the discharge pipe 22 with sufficient force to carry it into the branch pipes 23 and spray it through the nozzles 24.

For operating the fan 20 and beater shafts 16, a sprocket wheel 25 is fixed on the axle 4 just inside the frame as shown in Fig. 1. From this sprocket wheel, a sprocket chain 26 extends rearward and passes about a smaller sprocket wheel 27 mounted on a transverse counter shaft 28. This counter shaft is supported in bearing brackets 29 projecting from the rear end of the receptacle 8. Owing to the fact that the counter shaft is swung with the receptacle, some slack must be left in the chain 26 and a spring held idler 29¹ mounted on the frame to hold the chain taut.

Near the sprocket 27 a large grooved pulley 30 is fixed on the counter shaft; while a smaller grooved pulley 31 is fastened on the projecting end of the fan shaft 21. A crossed belt 32 runs over the pulleys and revolves the fan to the left with relation to Fig. 3. The ends of the beater shafts 16 extend through the rear end of the receptacle 8, and each has fastened on its projecting end, a miter gear 33 engaging with a similar gear 34 keyed on the counter shaft. The gears 34 are placed oppositely on the counter shaft whereby the gears 33 and beater shafts are revolved in opposite directions to throw the powder in each compartment toward the suction pipe 19.

I wish to lay particular stress on the adjustment of the spraying apparatus bodily on the frame, as by this arrangement the spray nozzles are raised or lowered and the relative positions of the supply and discharge means not altered. A further point of importance is the agitating of the powder which prevents the same from "packing" or "arching" in the compartments and permits it to be more readily drawn through the suction pipes.

What I claim is:

1. The combination in a powder duster, of a frame, an axle supporting the frame, ground wheels supporting the axle, crank rods mounted on the frame, a powder receptacle mounted on one of the crank rods, a fan box mounted on the other crank rod, side bars connecting the receptacle and the fan box together, a partition dividing the receptacle into two compartments, an agitator mounted to revolve in each compartment and having a beater shaft extending through one end of the receptacle, a counter shaft extending between the receptacle and the fan box, gears mounted on the shafts of the agitators, gears mounted on the counter shaft engaging the first named gears, a sprocket wheel mounted on the axle, a sprocket wheel mounted on the counter shaft a sprocket chain connecting the sprockets, a suction pipe leading from the upper end of each compartment to the upper end of the fan box, a fan mounted in the box and having a shaft extending through the box, a pulley mounted on the fan shaft, a larger pulley mounted on the counter shaft, and a belt running over the pulleys, a discharge pipe leading from the bottom of the fan box, branch pipes extending from the discharge pipe, spray nozzles mounted on the branch pipes, and a hand lever connected to one of the crank rods for swinging the same and raising and lowering the receptacle and the fan box.

2. The combination in a powder duster, of a frame mounted on ground wheels, a pair of crank rods pivoted in the frame, a powder receptacle mounted on one of the crank rods, a central partition dividing the powder receptacle into two longitudinal chambers, a pair of beater shafts, one mounted in each chamber of the receptacle and projecting from the rear end thereof, beaters extending from the shafts transversely of the powder receptacle, a fan box mounted on the other crank rod, a fan mounted in the fan box, a driving connection for the fan disposed outside of the fan box, pipe connections, one extending from each chamber of the powder receptacle to the fan box, a spraying member having connection with the fan box, a transverse countershaft mounted between powder receptacle and the fan box, driving connection between the countershaft and the beater shafts, a driving connection from the axle of the ground wheels to the countershaft, a second driving connection from the counter shaft to the driving connection of the fan, a segment mounted at one side of the frame, and a lever fixed on the crank shafts and having a plunger engaging the segment.

In testimony whereof I have signed my name to this specification in the presence of two subscribing witnesses.

WALTER H. McKNIGHT.

Witnesses:
W. M. COKER,
H. S. LOGAN.